Jan. 17, 1928.  1,656,763
W. B. SIBLEY
VALVE FOR GREASE GUNS
Filed Oct. 20, 1926
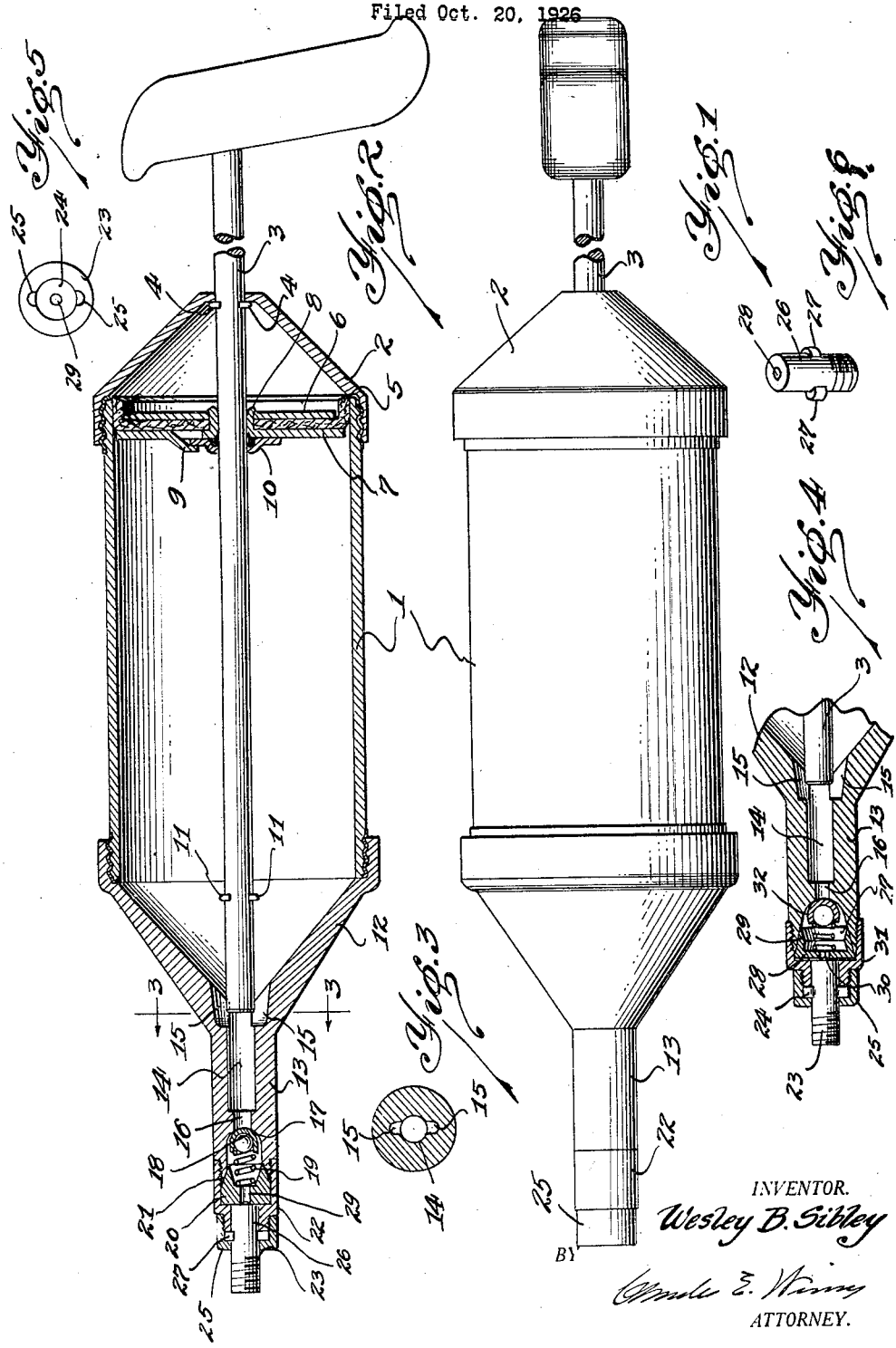
INVENTOR.
Wesley B. Sibley
BY
ATTORNEY.

Patented Jan. 17, 1928.

1,656,763

UNITED STATES PATENT OFFICE.

WESLEY B. SIBLEY, OF DETROIT, MICHIGAN, ASSIGNOR TO ACME DEVICES CORPORATION, OF DETROIT, MICHIGAN, A CORPORATION OF MICHIGAN.

VALVE FOR GREASE GUNS.

Application filed October 20, 1926. Serial No. 142,881.

This invention relates to valves for grease guns and the object of the invention is to provide a valve for a grease gun which will prevent discharge of lubricant except under pressure.

Another object of the invention is to provide a means for packing the valve so that no discharge of grease can occur between the assembled parts which contain the valve.

A further object of the invention is to provide a ball check valve preventing discharge of grease from the gun except when under pressure the ball being provided with a cup shaped leather cover to properly seat and close the discharge opening.

These objects and the several novel features of the invention are hereinafter more fully described and claimed and the preferred form of construction by which these objects are attained is shown in the accompanying drawings in which—

Fig. 1 is an elevation of a grease gun embodying my invention.

Fig. 2 is a longitudinal section therethrough.

Fig. 3 is a section taken on line 3—3 of Fig. 2.

Fig. 4 is a section showing an alternative type of valve.

Fig. 5 is an end view of the discharge end of the gun.

Fig. 6 is a perspective view of the fitting with which the gun is used.

As shown in Figs. 1 and 2 a cylindrical barrel 1 is provided for the gun and a cap 2 is threaded onto one end thereof. A stem 3 extends longitudinally through the cap and barrel and is provided with lugs 4 preventing the stem from being drawn out of the cap. A plunger is provided consisting of a cup shaped leather washer 5 which is secured between two metal plates 6 and 7. The plate 7 is extruded at the center providing a flange 8 which bindingly secures the parts of the plunger together and forms a guide for the plunger on the stem 3. The cup shaped washer 5 fits the interior of the cylindrical barrel 1 and the plate 7 is provided with a downwardly struck lug 9 which provides a means for securing the washer 10 to the plate 7, the washer 10 forming an additional guide for the plunger on the stem. At the lower end the stem is provided with a pair of lugs 11 which prevent the plunger from coming off from the stem when the gun is assembled. A discharge member 12 is fitted onto the lower end of the barrel 1 and is provided with a discharge nozzle 13 having a chamber 14 therein into which the end of the stem may be moved. A pair of notches 15 are provided as shown in Figs. 2 and 3 which are open at one end to the grease within the gun and open at the opposite end into the chamber 14. A discharge aperture 16 is provided leading from the bottom of the chamber 16 which is normally closed by the cup shaped leather washer 17 within which the ball 18 is positioned. The ball 18 is yieldably held in position by the spring 19 which seats in a member 20. This member 20 is provided with a conical outer face 21 which fits a similar face provided in the discharge end 13. The member 20 is preferably made of fiber and tightly fits the conical face in the end of the member 13 so that no leakage of grease can occur between these two parts. The fiber member 20 is held in place by a member 22 threaded onto the portion 13. A member 23 is threaded onto the member 22 as shown in Fig. 2 and is provided with an opening 24 in the center into which a pair of notches 25 open. This end is adapted for connection with a fitting 26 shown in Fig. 6 which is provided with a pair of lugs 27 adapted to be inserted through the notches 25 in the member 23. The fitting 26 is provided with an opening in the end which is normally closed by a spring pressed ball 28 shown in Fig. 6 and the lower end of this fitting is threaded as shown in the said figure. The end of the gun is positioned over the fitting 26 as shown in Fig. 2 and is given a partial turn so that the lugs 27 are engaged between the members 23 and 22. The distance between the top of the lugs 27 and the top of the member 26 is about one sixty-fourth of an inch greater than the distance between the bottom of the fiber member 20 and the bottom of the member 22 so that the end of the fitting 26 is held tightly against the member 20 to prevent leakage of grease. The central aperture 29 in the member 20 registers with the central aperture in the fitting 26 so that the grease under pressure forces the ball 28 downwardly and allows grease to pass through the fitting 26.

In operation the barrel 1 is filled with grease and this grease may pass through the notches 15 into the chamber 14. At this time upon downward movement of the stem grease is discharged from the chamber 14 past the ball 18 and out through the discharge nozzle. The stem is then drawn upwardly thus drawing a vacuum into the chamber 14 which is suddenly relieved as the end of the stem 3 moves past the end of the notches 15 and the vacuum draws additional grease through the notches 15 to fill the chamber 14. As the grease is discharged by continued operation of the stem the plunger is drawn downwardly thus wiping the inner surface of the barrel until the grease is practically all used up.

The use of the leather covered ball in this gun is particularly efficacious. Without the use of this leather cover the ball will not seat properly when any lint or foreign matter is present in the grease. When the ball does not seat properly the withdrawal of the stem from the chamber 14 draws air past the ball to relieve the vacuum thus preventing the grease from flowing into the chamber 14 and preventing proper operation of the grease gun. By use of the leather cover for the ball the discharge opening 16 is sealed and the drawing of the vacuum in the chamber 14 tends to seal the chamber more tightly at the discharge end and as the leather is soft and flexible foreign matter or lint does not prevent the proper seating of the valve.

An alternative form of construction is shown in Fig. 4 in which the chamber 27 for the ball is flared out at the bottom and a cup shaped leather washer 28 is provided having a tapered upper edge 29 and a central aperture 30 through which the grease may pass. This washer seals the joint between the lower end of the part 13 and the nut 31 which is threaded onto the end 13. In this form the grease under pressure holds the leather washer 28 in engagement with the walls of the chamber 27 and prevents leakage about the washer and the ball is provided with a cup shaped leather cover 32 which tends to seal the discharge opening 16 from the chamber 14 in the same manner as the ball and leather cover shown in Fig. 2.

From the foregoing description it becomes evident that the device is very simple and efficient in operation, will not easily get out of order, is composed of few parts and is of consequent low manufacturing cost and provides a device which accomplishes the objects described.

Having thus fully described my invention, its utility and mode of operation, what I claim and desire to secure by Letters Patent of the United States is—

1. The combination with a grease gun having a discharge chamber and a valve chamber provided with a conical inner wall, of a packing member having a discharge aperture therethrough and having a conical outer wall fitting and packing the conical inner wall of the valve chamber, means for maintaining the conical wall of the packing member in seated relation with the complemental wall of the valve chamber, a coiled spring seating in the packing member, a ball supported on the coiled spring and a cup shaped leather cover positioned over the ball and normally closing the discharge end of the discharge chamber.

2. The combination with a grease gun having a discharge chamber and a valve chamber having a conical inner wall, of a packing member having a discharge aperture therethrough, and having a conical outer wall fitting and packing the conical inner wall of the valve chamber, means for maintaining the conical wall of the packing member in seated relation with the complemental wall of the valve chamber, a coiled spring seating in the packing member, and a ball yieldably supported on the spring and normally closing the discharge end of the discharge chamber.

3. In a grease gun having a chamber through which material under pressure is to be discharged, the said chambered portion terminating in an externally threaded, internally coned end, an apertured packing member having an externally coned surface fitting in the coned surface of the said end, a third apertured member internally threaded for threaded engagement with the said end and having a shoulder providing a seat for the said packing member whereby said packing member is forced to sealing engagement with said conical end, a ball in the said end, and a spring between the ball and the packing member normally forcing the same to close the said chamber.

4. In a grease gun having a discharge chamber, a valve chamber at the end thereof, a ball in the chamber, a cup shaped member of leather loosely fitting over the ball, a cylindrical coiled spring extending into the cupped leather and engaging the ball preventing displacement of the leather cup and tending to maintain the ball with the cupped leather in sealing engagement with the discharge end of the discharge chamber.

5. In grease guns, wherein material is discharged under pressure, a nozzle formation including a chamber through which the material is discharged, a packing member at the outlet of said chamber, the said chamber and packing member having complemental faces co-operating in the assembly to provide a conical seating relation therebetween, and a removable member for securing the packing member to its seat.

6. In grease guns, wherein material is discharged under pressure, a nozzle formation including a chamber through which the material is discharged, said chamber having a valve seat, a packing member at the outlet of said chamber, the said chamber and packing member having complemental faces co-operating in the assembly to provide a conical seating relation therebetween, a removable member for securing the packing member to its seat, said packing member having a depressed seat, and a spring-held closure for the chamber valve seat, the spring of the closure extending into contact with such depressed seat.

7. In grease guns, wherein material is discharged under pressure, a nozzle formation including a chamber through which the material is discharged, a packing member at the outlet of said chamber, the said chamber and packing member having complemental faces co-operating in the assembly to provide a conical seating relation therebetween, and a removable member for securing the packing member to its seat, said removable member having an open end for the reception of a connecting fitting, said packing member being exposed within such open end, whereby said fitting will provide an additional means for maintaining the seated relation of the packing member.

In testimony whereof I sign this specification.

WESLEY B. SIBLEY.